US012391370B2

(12) United States Patent
Huber et al.

(10) Patent No.: US 12,391,370 B2
(45) Date of Patent: Aug. 19, 2025

(54) AIRCRAFT LANDING GEAR WITH NOISE REDUCTION FRONT AND REAR SHAPED ELEMENTS

(71) Applicants: AIRBUS OPERATIONS (SAS), Toulouse (FR); AIRBUS OPERATIONS LIMITED, Bristol (GB)

(72) Inventors: Jerome Huber, Toulouse (FR); Aline Scotto, Toulouse (FR); Maxime Itasse, Toulouse (FR); Robert Northam, Bristol (GB)

(73) Assignees: AIRBUS OPERATIONS LIMITED, Bristol (GB); AIRBUS OPERATIONS (SAS), Toulouse (FR)

( * ) Notice: Subject to any disclaimer, the term of this patent is extended or adjusted under 35 U.S.C. 154(b) by 275 days.

(21) Appl. No.: 17/992,598

(22) Filed: Nov. 22, 2022

(65) Prior Publication Data
US 2023/0227150 A1  Jul. 20, 2023

(30) Foreign Application Priority Data
Nov. 25, 2021  (FR) ...................................... 2112524

(51) Int. Cl.
*B64C 25/00* (2006.01)
(52) U.S. Cl.
CPC ...... *B64C 25/001* (2013.01); *B64C 2025/003* (2013.01)
(58) Field of Classification Search
CPC .............................................. B64C 2025/003
See application file for complete search history.

(56) References Cited

U.S. PATENT DOCUMENTS

| 2,129,824 | A | 9/1938 | Seversky | |
|---|---|---|---|---|
| 8,490,914 | B2 | 7/2013 | Chow et al. | |
| 2007/0108344 | A1 | 5/2007 | Wood | |
| 2010/0108805 | A1* | 5/2010 | Piet | B64C 25/16 |
| | | | | 244/1 N |
| 2010/0155529 | A1* | 6/2010 | Chow | B64C 25/001 |
| | | | | 244/1 N |
| 2011/0309193 | A1 | 12/2011 | Seror Goguet | |

(Continued)

FOREIGN PATENT DOCUMENTS

| EP | 3 269 524 | 1/2018 |
|---|---|---|
| GB | 768934 | 2/1957 |

(Continued)

OTHER PUBLICATIONS

European Search Report cited in EP 22208810.6 mailed Jan. 20, 2023, 9 pages.

*Primary Examiner* — Arfan Y. Sinaki
(74) *Attorney, Agent, or Firm* — Nixon & Vanderhye P.C.

(57) ABSTRACT

An aircraft landing gear 100 includes a structural main leg 110, having a substantially circular cross-section and defining a front side for facing upstream in use and a rear side for facing downstream in use. The landing gear includes a shaped element 151 attached to an attachment point located on the rear side of the structural main leg. The shaped element extends rearwards from the structural main leg to provide a combined cross-sectional shape of the structural main leg and shaped element that is elongated in the upstream-downstream direction compared to the structural main leg.

16 Claims, 4 Drawing Sheets

(56) References Cited

U.S. PATENT DOCUMENTS

2014/0131514 A1* 5/2014 Cook .................. B64C 25/16
                                                    244/100 R
2015/0251750 A1   9/2015 Cook et al.
2017/0361923 A1* 12/2017 Himmelmann ........ B23K 9/173

FOREIGN PATENT DOCUMENTS

WO     2004/089742    10/2004
WO     2005/096721    10/2005

* cited by examiner

AIRCRAFT LANDING GEAR WITH NOISE REDUCTION FRONT AND REAR SHAPED ELEMENTS

RELATED APPLICATION

This application incorporates by reference and claims priority to French patent application FR 2112524, filed Nov. 25, 2021.

TECHNICAL FIELD

The present invention concerns aircraft landing gears. More particularly, but not exclusively, this invention concerns an aircraft landing gear having a structural main leg with a substantially circular cross-section and defining a front side facing upstream and a rear side facing downstream.

BACKGROUND

There are many different aircraft landing gears. However, many of such landing gears are not designed or adapted for noise reduction purposes. In particular, there is no consideration of noise reduction when the doors are open and the landing gear is deployed, for example on landing approach. Here, it is important to reduce the noise footprint of the aircraft. This is different to wishing to reduce the drag, as that is not a concern when the aircraft is landing and slowing down anyway.

WO 2004/089742 describes various ways to reduce the noise generated by the landing gear.

SUMMARY

The present invention seeks to mitigate one or more of the above-mentioned problems. Alternatively or additionally, the present invention seeks to provide an improved aircraft landing gear.

The project leading to this application has received funding from the European Union's Horizon 2020 research and innovation programme under grant agreement No. 769350.

The present invention provides, according to a first aspect, an aircraft landing gear comprising a structural main leg, the structural main leg having a substantially circular cross-section and defining a front side for facing upstream in use and a rear side for facing downstream in use, wherein the landing gear further comprises a shaped element attached to an attachment point located on the rear side of the structural main leg, and wherein the shaped element extends rearwards from the structural main leg to provide a combined cross-sectional shape of the structural main leg and shaped element that is elongated in the upstream-downstream direction compared to the structural main leg.

Such a shaped element acts to elongate the leg. For example, compared to a circular cross-section, the overall cross-section of the leg as interacted with by the airflow, in use, may be an aerofoil. This reduces the noise of the airflow flowing past the landing gear, when deployed. Hence, it means that the aircraft using such a landing gear will have a lower noise footprint, especially when the landing gear is deployed and the aircraft is coming into land.

The shaped element can be thought of as a "leg shape modifier". The shaped element may be thought of as a "leg elongation portion".

In the above, and throughout the specification, the terms fore/aft, forward/backward, upstream/downstream, behind/ in front, height, side etc. should be construed in relation to the conventional terms for an aircraft during normal flight. For example, upstream corresponds to a forward/fore region and downstream corresponds to a backward/aft region. Width corresponds to a dimension perpendicular to the upstream/downstream (longitudinal axis) direction. Height corresponds to the dimension in the upward/vertical (z) direction, in relation to a level orientation of the aircraft with respect to the ground.

The structural main leg is defined as the main leg providing structural support of the landing gear when in a weight on wheels (WoW) situation. In other words, the structural main leg includes all structural components or portions of the main leg, designed to take the landing gear load, but does not include non-structural components.

The structural main leg may also define a delineating line, delineating between the front side and rear side and having a length corresponding to the maximum width dimension across the structural main leg.

The landing gear may further comprise a sidestay extending sideways from the structural main leg.

The cross-sectional shapes referred to above and below relate to the cross-sectional shape as experienced by the air flow, for example that the airflow does not penetrate. In other words, the cross-section shape is defined by a boundary for the airflow. As, the structural main leg is a boundary for the airflow (i.e., the airflow cannot enter the leg) and so is the shaped element, the airflow experiences a combined cross-section shape of these two elements.

The attachment point is located on the rear side of the leg and hence, the shaped element is directly attached to the rear side of the leg. In certain embodiments, this may make attachment simpler and easier and can be done independently of other elements around the leg.

The shaped element may be attached or connected only to the rear side of the structural main leg. In other words, it may be that it is not directly attached or directly connected to any other part of the landing gear.

The shaped element may be attached to the rear side in any suitable way. For example, it may be riveted or fastened, it may be attached using a bracket and/or it may be attached using adhesive. For example, the adhesive may be located to the rear side (only) of the structural main leg. The shaped element may be moveably attached or secured to the rear side. For example, the shaped element may move to deploy as the landing gear is deployed.

The landing gear may be moveably mountable in relation to a landing gear bay of the aircraft, to move between a stowed position, in which it is stowed within the landing gear bay, and a deployed position, in which it extends out from the landing gear bay.

The attachment point may be part of an attachment region, the attachment region providing attachment of the shaped element to the structural main leg. For example, the attachment region may form an effective collection of attachment points. The attachment region may extend along a length of the structural main leg. The attachment region may have a height corresponding to at least 50%, optionally at least 70%, or at least 80% of the height of the structural main leg. There may be embodiments in which benefit could be provided by means of an attachment region having a height corresponding to between 20% and 50% of the height of the structural main leg. Here, the height refers to the vertical dimension when the leg is deployed. The attachment region may extend along the rear side (only) of the structural main leg.

The shaped element may have a height corresponding to at least 50%, optionally at least 70% or at least 80% of the height of the structural main leg. There may be embodiments in which benefit could be provided by means of a shaped element having a height corresponding to between 20% and 50% of the height of the structural main leg.

Here, the height refers to the vertical dimension when the leg is deployed. Hence, this provides an effective noise reduction over a large portion of the leg length.

The shaped element may have a height corresponding to at least 50%, optionally at least 80% or at least 90% of the height of a landing gear bay door.

The shaped element has a maximum width that is no more than 110%, or no more than 105%, of the maximum width of the structural main leg.

The shaped element may have a maximum width that is no more than the maximum width of the structural main leg.

The shaped element may have a maximum width of at least 50% the maximum width of the landing gear leg.

It may be that the shaped element is a solid element. It may be that a single element provides the external boundary (or boundaries) of the shaped element. It may be that the single element is not completely hollow.

The solid element may comprise a front profile shaped to correspond to the rear side of the structural main leg.

The shaped element may be formed by a single fairing. In embodiments, it may be that the shaped element is formed by a number of fairings—for example, it may be that a number of fairings provide the external boundary (or boundaries) of the shape of the shaped element. The number of fairings may be two or more.

The shaped element may be non-structural. In other words, it is not designed to take significant structural load. It may be that the shaped element is of lightweight construction, for example with sufficient strength to withstand loads, due to airflow. Parts of the interior of the shaped element may be hollow or filled with lightweight solid material.

The shaped element may have a length in the upstream/downstream direction that is more than the maximum width of the structural main leg, or more than 150% of the maximum width of the structural main leg.

The mid point of the length of the shaped element is downstream of a centre of the landing gear leg in the upstream/downstream direction and may be spaced apart from and downstream of the landing gear leg.

The shaped element may provide a cross-section that tapers, such as to a point, in the downstream direction. For example, the tapering of the shaped element may provide a substantially triangular cross-section.

It may be that the shaped element provides a cross-section that has a rounded rear profile. It may be that the shaped element provides a cross-section that tapers non-linearly (i.e., not with straight lines) for most, if not all, of the tapering portion.

The shaped element may provide a cross-section corresponding to an end of an ellipse.

The shaped element may have a cross-section that tapers with a curve that is streamlined. The cross-section may have a shape that is in the general form of an aerofoil shape, or a part of the end of an aerofoil shape.

The landing gear may further comprise a front shaped element attached to an attachment mechanism located on the front side of the structural main leg, and wherein the front shaped element extends forwards from the structural main leg to provide an combined cross-sectional shape of the structural main leg and front shaped element that is elongated in the upstream-downstream direction compared to the structural main leg.

The front shaped element may have any of the equivalent (i.e., on front, rather than rear, side of structural main leg) as the first (rear) shaped element.

The front shaped element and rear shaped element may be the same or corresponding shape. They may be facing in opposite directions (i.e., effectively a mirror image of each other).

The combined cross-sectional shape of the structural main leg, front shaped element and rear shaped element may be an ellipse.

According to a second aspect of the invention there is also provided an aircraft landing gear arrangement including the aircraft landing gear as described above and an aircraft landing gear bay, wherein the landing gear is pivotally mountable in relation to the aircraft landing gear bay between a stowed and a deployed position, and comprising a number of landing gear wheels arranged to roll in a fore/aft direction when in the deployed position.

According to a third aspect of the invention there is also provided an aircraft comprising the aircraft landing gear or aircraft landing gear arrangement as described above.

According to a fourth aspect of the invention there is also provided a method of operating an aircraft, including the step of using the aircraft landing gear, the aircraft landing gear arrangement or aircraft as described above.

According to a fifth aspect of the invention there is also provided a method of operating an aircraft comprising the steps of deploying a landing gear, including a structural main leg, and providing a shaped element positioned on a rear side of the structural main leg, the shaped element causing air flow past the structural main leg to be directed around an elongated cross-section.

According to a sixth aspect of the invention there is also provided a method of reducing noise generated by a landing gear on landing approach, comprising the steps of deploying a landing gear, including a structural main leg, and a shaped element positioned on a rear side of the structural main leg causing air flow past the structural main leg to be directed around an elongated cross-section.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 3b shows a front perspective view of the landing gear arrangement of FIG. 3a;

FIG. 3c shows a plan view of the landing gear arrangement of FIG. 3a; and

DETAILED DESCRIPTION

Figure 1:
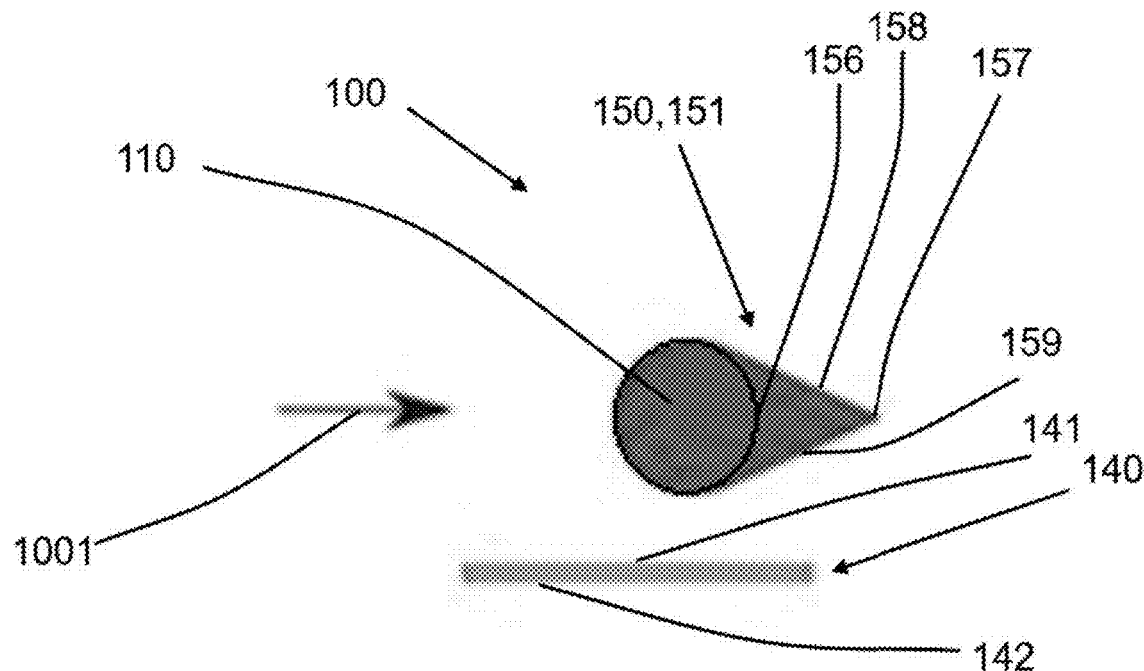
FIG. 1 shows a schematic plan view of a landing gear arrangement according to a first embodiment of the invention.
Figure 3A:
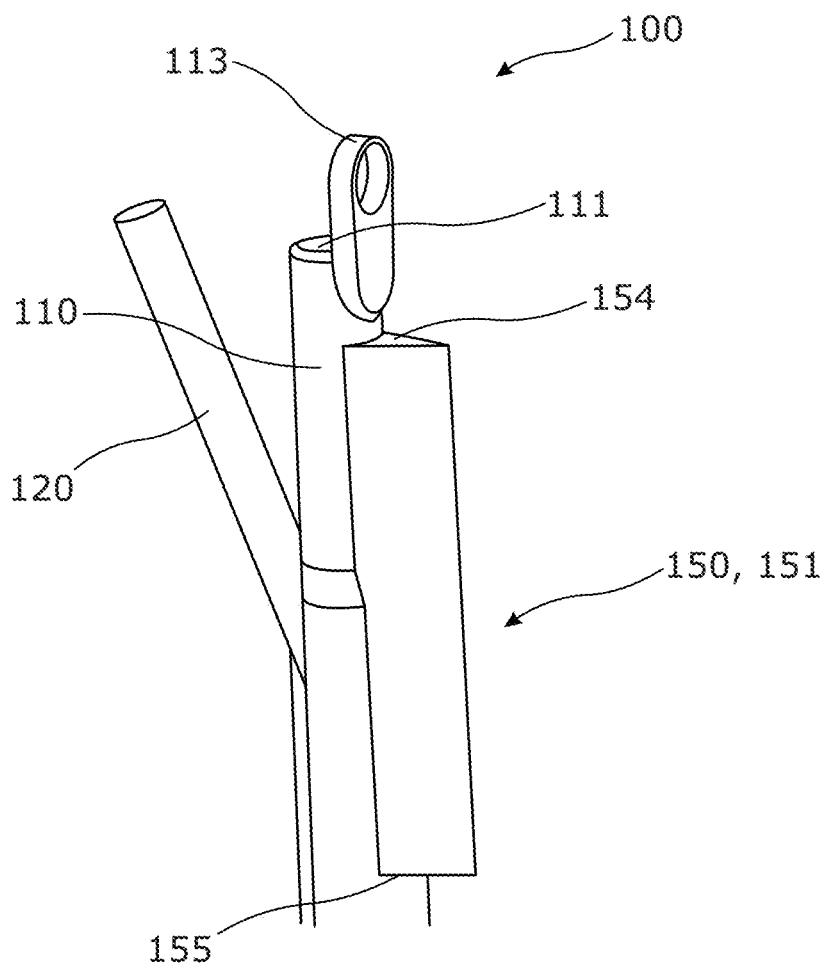
FIG. 3a shows a rear perspective view of the landing gear arrangement according to the first embodiment of the invention.
Figure 3B:
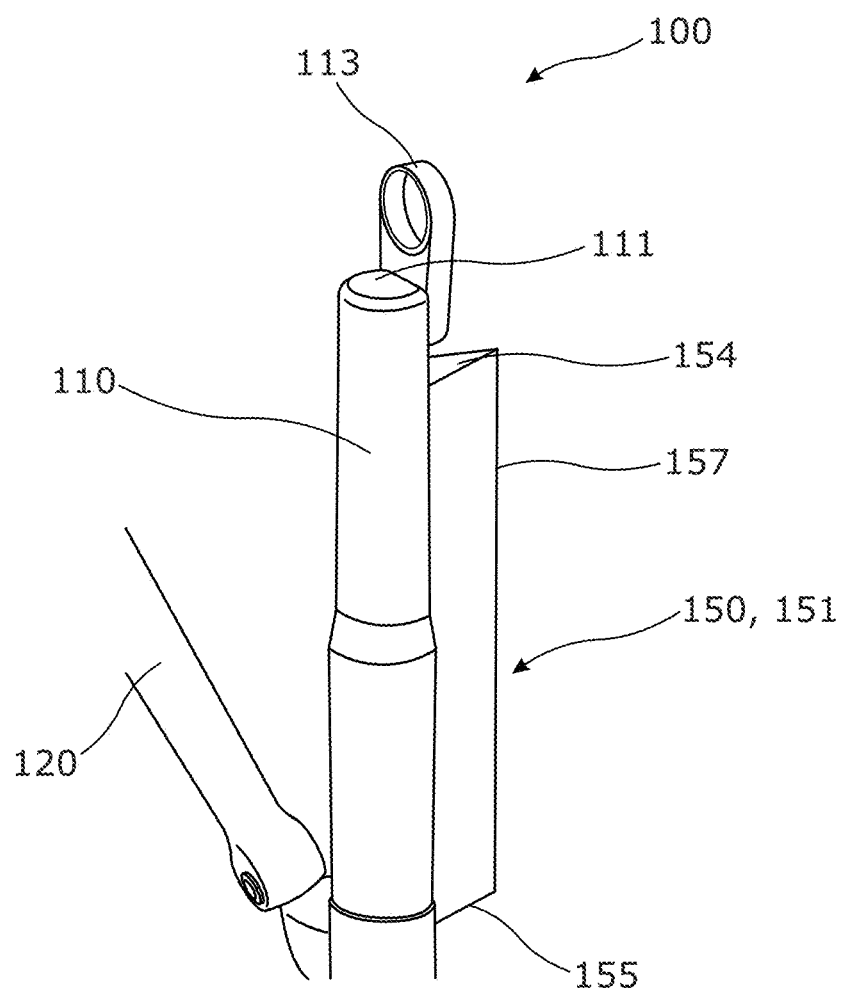
Figure 3C:
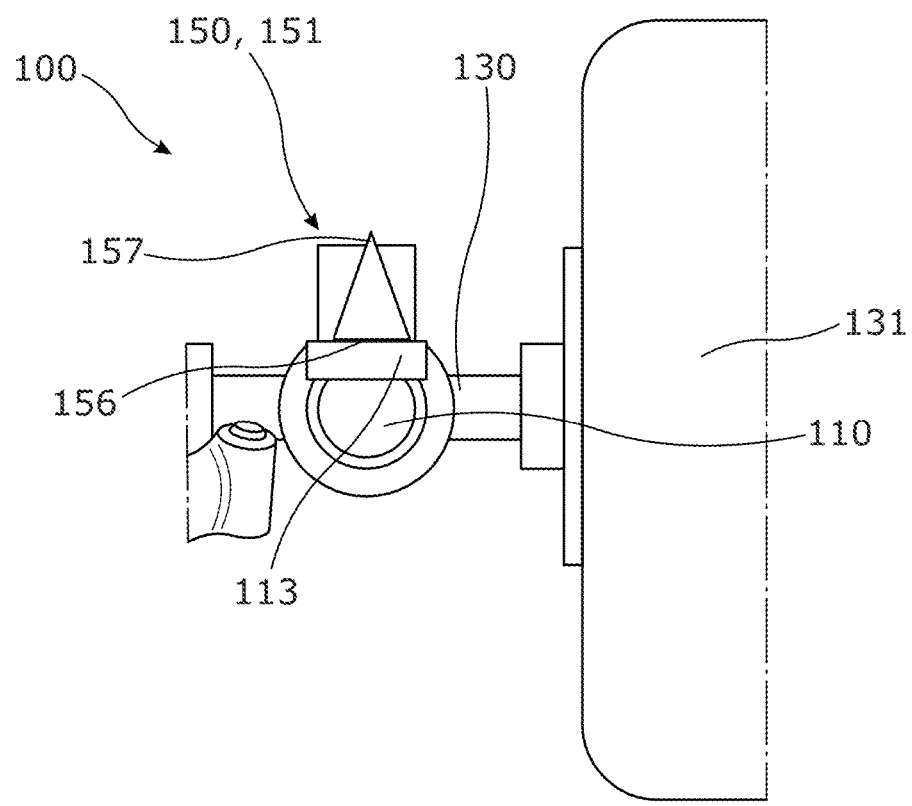

FIG. 1 shows a schematic plan view of a landing gear arrangement 100 according to a first embodiment of the invention. FIG. 3a shows a rear perspective view of the landing gear arrangement 100. FIG. 3b shows a front perspective view of the landing gear arrangement 100. FIG. 3c shows a plan view of the landing gear arrangement 100.

The arrangement 100 comprises a landing gear main leg 110, which, in use, is pivotally connected to an aircraft by a pivot mechanism 113 at the top 111 of the leg. At the bottom of the leg is an axle 130, which mounts two landing gear wheels (one of which can be seen and is labelled as 131). The wheels 131 roll in a fore/aft (or longitudinal) direction. A side stay 120 is pivotally mounted on the leg 110 and also to the aircraft, in use.

The arrangement 100 also includes a landing gear bay door 140. The door 140 has an outer side 142 (facing away from the leg 110) and an inner side 141 (facing the leg 110). The door 140 is attached to the leg 110 and pivotally moves relative to the aircraft as the landing gear leg 110 deploys.

The landing gear main leg 110, side stay 120, axle/wheels 130 and door 140 are entirely conventional and comprise various other elements/features, such as oleo struts, support arms/braces, electrical installations, brake assemblies, actuators etc. which will not be described here.

The arrangement 100 further comprises a leg shape modifier 150 that is attached to the rear of the leg 110 (i.e., behind the leg in relation to oncoming longitudinal airflow 1001).

The leg shape modifier 150, here, is a substantially triangular piece 151, with a concavely curved front side 156, which correspond to and is attached with adhesive to the rear of the leg 110, and a rear tipped point 157 which extends backwards from the leg 110. The overall plan shape formed by the leg 110 and modifier 150 is a droplet.

In FIG. 3c, pivot mechanism 113 of the landing gear arrangement 100 is blocking sight of the modifier 151 and hence side 156 appears flat in this view. However, as mentioned above side 156 is a concavely curved side that corresponds to the part-circular shape of the rear of the main leg 110.

As can be seen in FIG. 3a, the leg modifier 150,151 extends from near the top of the leg 111 at a top 154 of the modifier to a location approximately ¾ of the length of the leg 110 to a bottom 155 of the modifier 151. The bottom 155 of the modifier 151 is roughly in line with the connection of the side stay 120 to the leg 110 and the lowest point (not shown) of the door 140.

The leg modifier 151 is a solid piece that provides two tapering airflow surfaces 158, 159 that taper to point 157. This acts to prevent the airflow from becoming turbulent behind the leg 110 as the two surfaces 158, 159 act to block the air from entering the space behind the leg 110 and so prevent eddies from forming. Instead, the airflow is guided smoothly around the leg 110.

Figure 2:
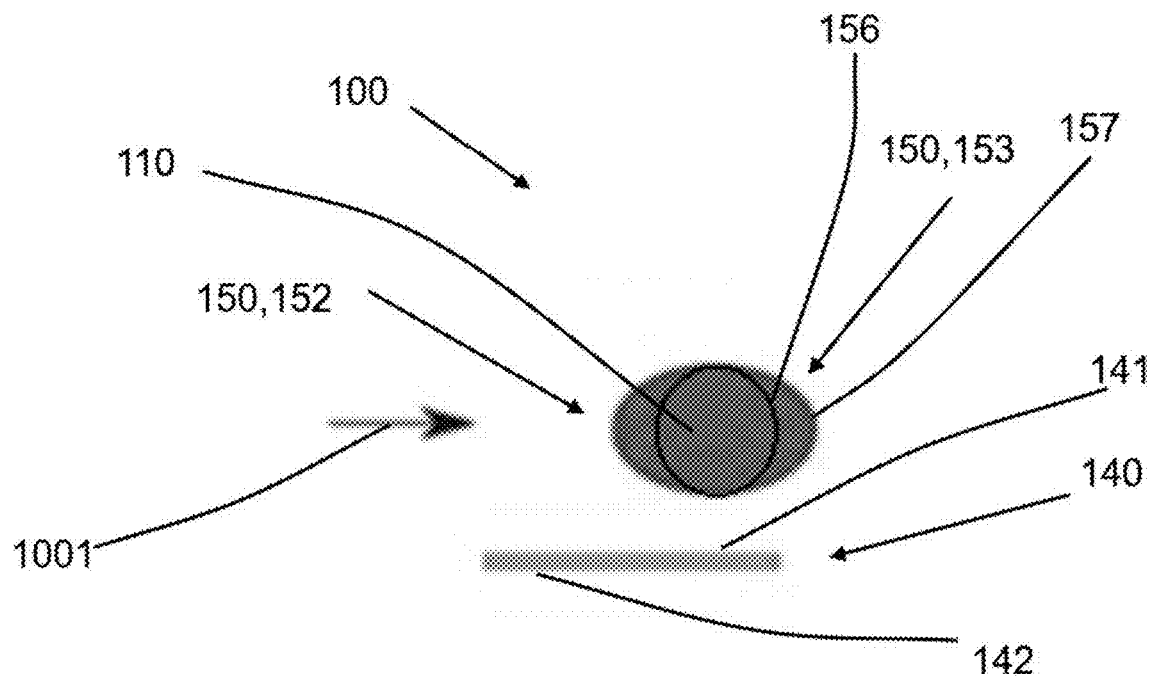
FIG. 2 shows a schematic plan view of a landing gear arrangement according to a second embodiment of the invention.

FIG. 2 shows a schematic plan view of a landing gear arrangement 100 according to a second embodiment of the invention. The second embodiment is very similar to the first embodiment, and only the differences will be described below.

Here, the leg 110 is provided with two leg shape modifiers 150.

The first is, in plan view, a left-handed crescent shaped element 152. It has a rear side that corresponds to and is attached to the front side of the leg 110 (similar to side 156 of the first embodiment). A front side of the modifier 152 is also curved and has the shape of a half ellipse.

The second leg shape modifier is, in plan view, a right-handed crescent shaped element 153. It has a front side that corresponds to and is attached to the rear side of the leg 110 (similar to side 156 of the first embodiment). A rear side of the modifier 153 is also curved and has the shape of a half ellipse 157. This half ellipse is the opposite half to that provided by modifier 152.

Hence, both modifiers 152, 153 attached around the leg 110 provide an overall ellipse shape for the airflow 1001.

The leg modifiers 152, 153 are two solid pieces that provide a fairing around the leg 110. They act to prevent the airflow from becoming turbulent behind the leg 110 as they block the air from entering the space behind the leg 110 and so prevent eddies from forming. Instead, the airflow is guided smoothly around the leg 110.

Figure 4:
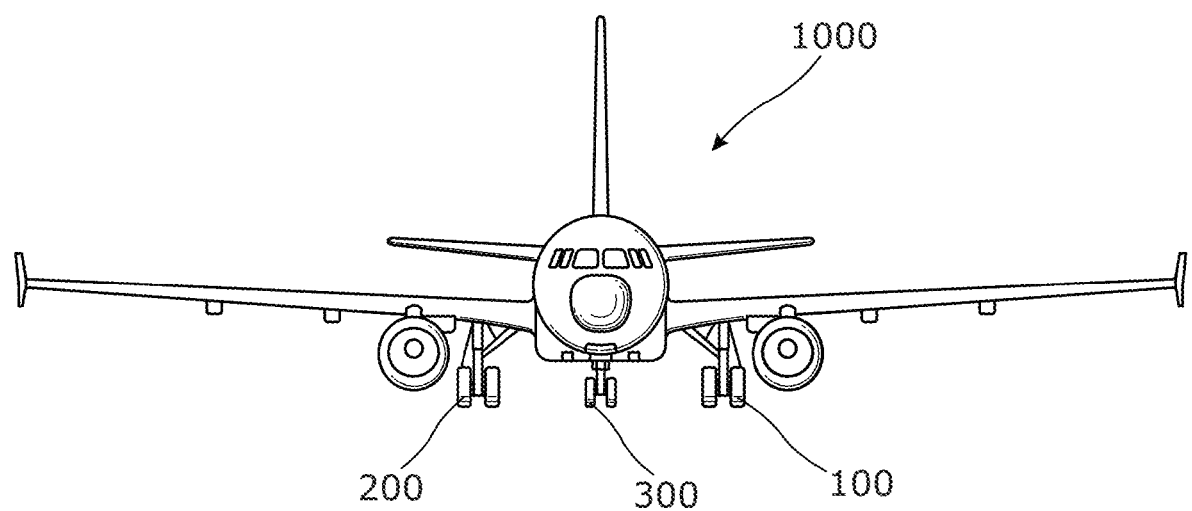
FIG. 4 shows a schematic front view of an aircraft with a nose landing gear arrangement and two main landing gear arrangements, the landing gear arrangements being suitable for being in accordance with the first or second embodiments of the invention.

FIG. 4 shows a schematic front view of an aircraft 1000 with a nose landing gear arrangement 300 and two main landing gear arrangements 100, 200, the landing gear arrangements being suitable for being in accordance with the first or second embodiments of the invention.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the above examples, the leg modifiers are solid. However, instead, the airflow surfaces could be provided by a number of linked fairings.

The leg modifiers may be any suitable shape and size. It may be that a leg modifier that extends along the leg over a distance that is less than half the height of the main leg could still be of benefit. There may be modifiers located on the aft or both fore and aft sides of the leg. The shape of the leg plus modifiers when viewed in cross-section may be other shapes, for example tear-drop shaped, aerofoil-shaped or other generally streamlined shapes.

There may be any suitable number of leg modifiers used on the leg.

The modifiers may be attached to the leg by any suitable means, such as using a bracket, rivets, or made integrally.

The leg modifiers may be made of any suitable material. They may be 3D printed. They may be made from material different from the door for example. They may comprise a carbon fibre composite.

The leg modifiers may be a fixed element, as in the above examples. Alternatively, they may take up the deployed position when the door is open and the landing gear is deployed and may take up a stowed position at other times. The leg modifier may be actuated to move (for example, to the deployed position) or may be biased to move (for example it may be biased to move to the deployed position when another element, such as the aircraft body, moves relatively out of the way).

The door 140 may be attached directly to an aircraft (not via the leg 110). For example, at a door top edge, there may be an attachment mechanism to pivotally mount the door 140 to an aircraft, in use.

The outline of the door may be differently shaped for a different aircraft in view of the shape of the opening of the landing gear bay required to allow the deployment therethrough of the landing gear, which may be differently configured depending on the design of the aircraft concerned. For example, not all landing gear legs are provided with a side stay.

It will be appreciated that the landing gear leg 110 may have any suitable number of wheels, for example being greater than two.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or", unless stated otherwise.

Although the invention has been described above mainly in the context of a fixed-wing aircraft application, it may also be advantageously applied to various other applications, including but not limited to applications on vehicles such as helicopters, drones, trains, automobiles and spacecraft.

The invention claimed is:

1. An aircraft landing gear attached to an aircraft, the aircraft landing gear comprising:
    a structural main leg which is substantially circular in cross-section and defines a front side configured to face in an upstream direction with respect to a flight direction of the aircraft and a rear side configured to face in a downstream direction with respect to the flight direction,
    a front shaped element attached to a first attachment point on the front side of the structural main leg, wherein the front shaped element extends in the upstream direction from the first attachment point, and
    a rear shaped element attached to a second attachment point located on the rear side of the structural main leg, wherein the rear shaped element extends in the downstream direction from the second attachment point on the structural main leg,
    wherein a first combined cross-sectional shape of the structural main leg and the rear shaped element tapers in the downstream direction,
    wherein a second combined cross-sectional shape of the structural main leg and the front shaped element tapers from the structural main leg in the upstream direction, and
    wherein the front shaped element is elongated in the upstream direction as compared to the structural main leg.

2. The aircraft landing gear as claimed in claim 1, wherein the rear shaped element has a height corresponding to at least 50% of a height of the structural main leg.

3. The aircraft landing gear as claimed in claim 1, wherein the rear shaped element has a maximum width that is no more than 110% of a maximum width of the structural main leg.

4. The aircraft landing gear as claimed in claim 1, wherein the rear shaped element has a maximum width that is no more than a maximum width of the structural main leg.

5. The aircraft landing gear as claimed in claim 1, wherein the rear shaped element is a solid element.

6. The aircraft landing gear as claimed in claim 5, wherein the solid element comprises a front profile shaped to correspond to the rear side of the structural main leg.

7. The aircraft landing gear as claimed in claim 1, wherein the rear shaped element includes a fairing.

8. The aircraft landing gear as claimed in claim 1, wherein the rear shaped element is non-structural.

9. The aircraft landing gear as claimed in claim 1, wherein the rear shaped element has a length in the downstream direction that is greater than a maximum width of the structural main leg.

10. The aircraft landing gear as claimed in claim 1, wherein the rear shaped element has a gradually tapered cross-section in the downstream direction.

11. The aircraft landing gear as claimed in claim 1, wherein the rear shaped element is substantially triangular in cross-section.

12. The aircraft landing gear as claimed in claim 1, wherein the rear shaped element has a cross-sectional shape rounded in rear profile.

13. The aircraft landing gear as claimed in claim 12, wherein the rear shaped element has a cross-sectional shape corresponding to an end of an ellipse.

14. The aircraft landing gear as claimed in claim 1 wherein a third combined cross-sectional shape of the structural main leg, the front shaped element and the rear shaped element is an ellipse.

15. An aircraft comprising the aircraft landing gear of claim 1.

16. A method of operating an aircraft, including the step of using the aircraft landing gear of claim 1.

* * * * *